H. DE B. BARNES.
AUTOMOBILE FENDER.
APPLICATION FILED SEPT. 16, 1910.

1,002,114.

Patented Aug. 29, 1911.

2 SHEETS—SHEET 1.

Witnesses:
William Miller
Christian H. Almstaedt

Inventor
Harry De Bow Barnes
By his Attorneys

H. DE B. BARNES.
AUTOMOBILE FENDER.
APPLICATION FILED SEPT. 16, 1910.
1,002,114.
Patented Aug. 29, 1911.
2 SHEETS—SHEET 2.
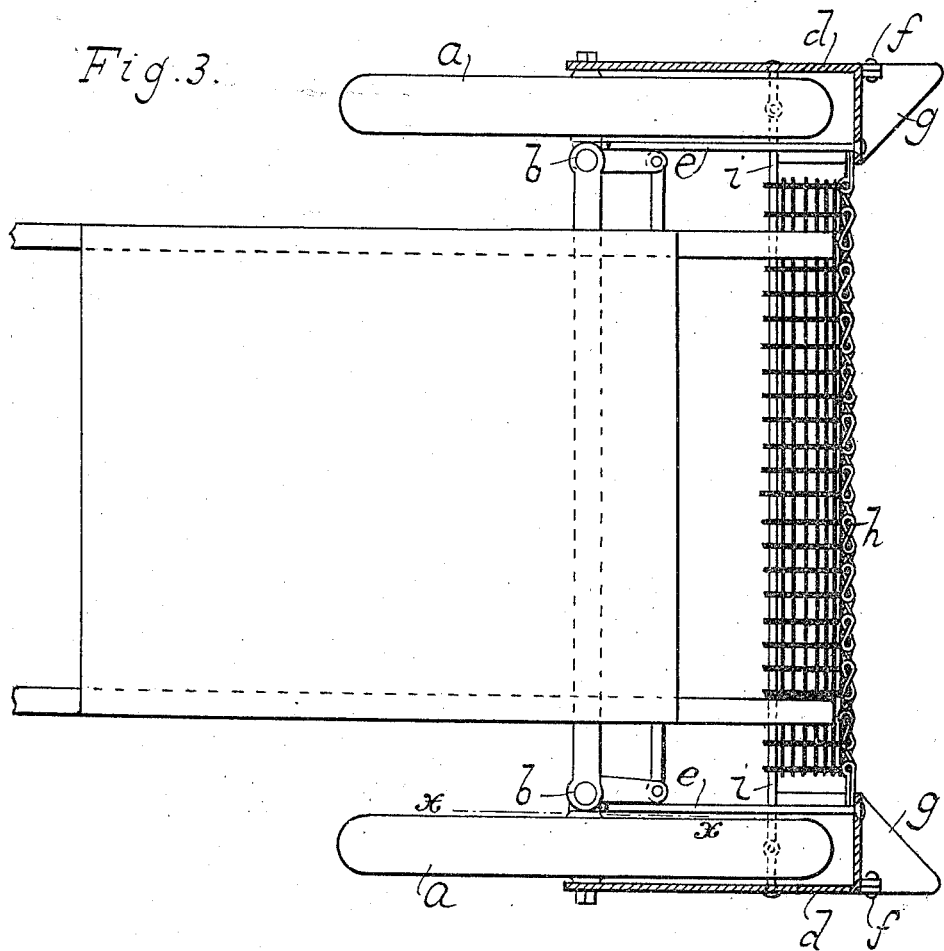
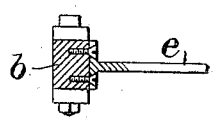
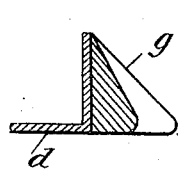
Witnesses:
William Miller
Christian W. Umstaedt
Inventor
Harry De Bow Barnes
By his Attorneys Hauff & Warland
Per Wm E. Warland

UNITED STATES PATENT OFFICE.

HARRY DE BOW BARNES, OF BRADLEY BEACH, NEW JERSEY.

AUTOMOBILE-FENDER.

1,002,114.

Specification of Letters Patent. Patented Aug. 29, 1911.

Application filed September 16, 1910. Serial No. 582,355.

*To all whom it may concern:*

Be it known that I, HARRY DE BOW BARNES, a citizen of the United States, residing at Bradley Beach, in the county of Monmouth and State of New Jersey, have invented new and useful Improvements in Automobile-Fenders, of which the following is a specification.

This invention relates to an improvement in fenders which is particularly adapted for self propelled vehicles, such as automobiles and motor trucks, and the object of the invention is to prevent persons who may inadvertently get in the path of the vehicle, from being injured by the wheels or car body.

This invention consists in providing each of the front wheels of an automobile with shields which are loosely mounted on the wheels and are fastened to the knuckle joints or axle of the vehicle. These shields, when the wheels are actuated to steer the vehicle will move horizontally with the wheels. The shields have fastened to their inner sides a flexible fender which extends transversely from one shield to the other and covers the front of the car, the fender being adapted to prevent persons who have fallen or slipped in front of the car from getting under the vehicle, while the side shields prevent a person from accidentally being dragged under the wheels.

The novel features of the invention are more fully set forth in the following specification and claims and illustrated in the accompanying drawing in which:—

Figure 1:
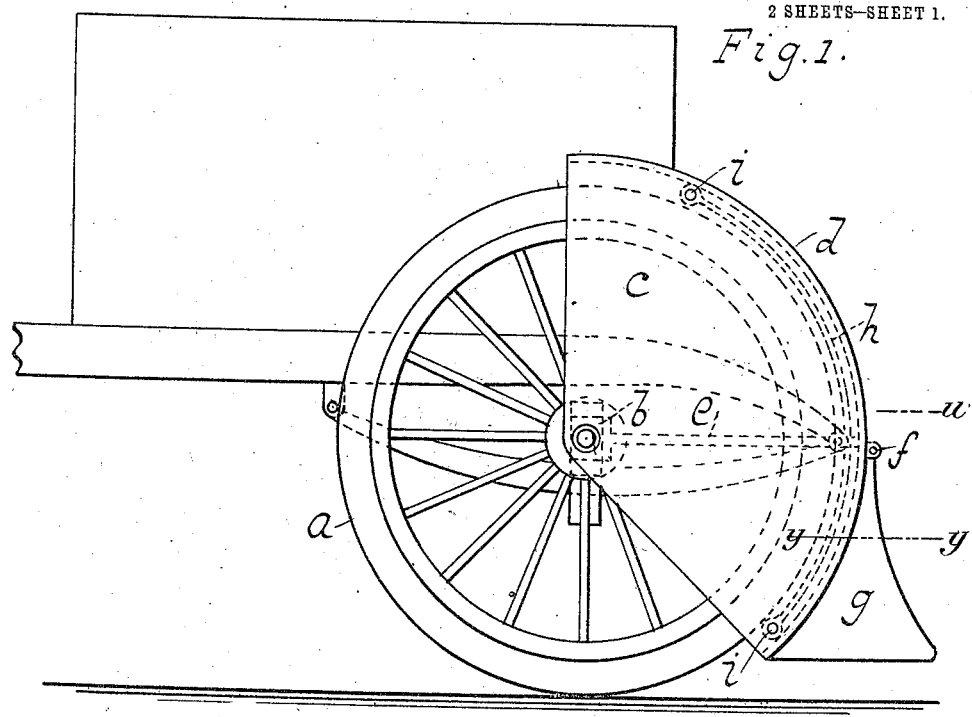
Figure 2:
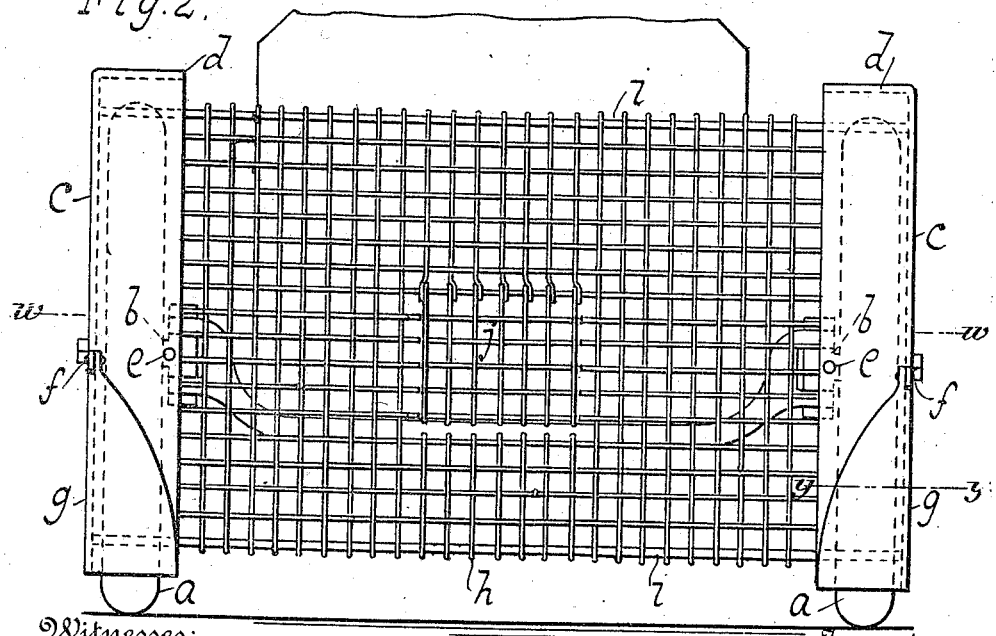

Figure 1 represents a side elevation of the front portion of a vehicle embodying this invention. Fig. 2 is a front elevation of the same. Fig. 3 is a horizontal section taken along the line $w$—$w$ of Figs. 1 and 2. Fig. 4 is a detail section of a knuckle joint taken along the line $x$—$x$ of Fig. 3. Fig. 5 is a detail section taken along the line $y$—$y$, Figs. 1 and 2.

In this drawing the letter $a$ designates the front wheels of a vehicle, such as an automobile, and $b$ are the knuckle joints located at each end of the front axle. These joints allow the wheels to be swung horizontally for the purpose of steering the vehicle. On the said wheels are mounted two shields $c$ which extend loosely about the hub of the wheel and cover a portion of the side thereof; each of the said shields have a rim $d$ of suitable shape to cover the periphery of and preferably curved to conform to the circumstances of the wheel. Each of these shields is fastened by means of an arm or bracket $e$ to the knuckle joint $b$ of the vehicle. Each arm $e$ has one of its ends preferably riveted to a shield while the other end of the arm is fastened to the movable part of the knuckle joint of the vehicle.

In case the vehicle has no knuckle joint for steering the arms may be secured directly to the axle and thus swing horizontally with the axle and its wheels.

To the rim portion of each shield is hinged at $f$ a guard $g$ which extends downwardly to within a short distance of the ground. The front portion of this guard is concaved while the inner portion is beveled so that when an object such as a stone strikes this portion of the shield it will glance off and be thrown aside. These guards can be swung upward to rest on the rim of the shields when not in use.

Each of the shields is equipped with a guard $g$ which is formed of a single piece of metal and pivoted at its upper end to a shield. The inner side of each guard is beveled or formed like a plowshare, so that when a guard strikes an obstruction, such as a loose stone, it will throw it aside and thereby prevent injury to the shield.

A fender $h$ is fastened preferably by means of the upper and lower rods $i$ to the inner sides of the shields. The rods $i$ extend from one shield to the other and have their ends riveted or fastened to each of the shields, thus connecting both shields together. This fender may consist of wire mesh, rope netting or it may be formed of flexible lattice work, and it extends transversely along the front of the vehicle.

The fender $h$ is provided with a hinged lid $j$ which can be opened when necessary in order to allow the machine to be cranked.

It will be seen that when the vehicle is steered or when the front wheels are actuated horizontally the shields will move in unison therewith.

The shields form guards for the side portions of the car while the fender prevents a person or object from being injured by the front portion of the car.

I do not confine myself to the precise shape of the shields as the form thereof may be varied without departing from the construction shown.

As shown in Fig. 4 each arm $e$ is provided with a flange at one end whereby the arm is fastened by means of screws to the knuckle joint of the vehicle.

I claim:—

1. In a device of the kind described, the combination with the wheels of a motor vehicle, of a pair of shields mounted on and adapted to cover a portion of the periphery and sides of the wheels, devices for connecting the shields together, a fender connected to the inner sides of the shields and extending across the front part of the vehicle, and devices for securing the shields to the knuckle joints of the vehicle.

2. In a device of the kind described, the combination with the wheels of a motor vehicle, of a pair of shields mounted on and adapted to cover a portion of the periphery and sides of the wheels, devices for connecting the shields together, a fender mounted on the connecting parts of the shields and extending transversely along the front of the vehicle and devices for securing the shields to the knuckle joints of the vehicle.

3. In a device of the kind described, the combination with the wheels of a motor vehicle, of a pair of shields mounted on and adapted to cover a portion of the periphery and sides of the wheels, devices for connecting the shields together, movable hinged guards located at the lower part of each of the shields, a fender mounted on the connecting devices of the shields and extending transversely along the front of the vehicle, and devices for securing the shields to the knuckle joints of the vehicle.

In testimony whereof I have hereunto set my hand in the presence of two subscribing witnesses.

HARRY DE BOW BARNES.

Witnesses:
FRANCIS H. WARLAND,
HENRY HERZ.